United States Patent Office 3,046,038
Patented July 24, 1962

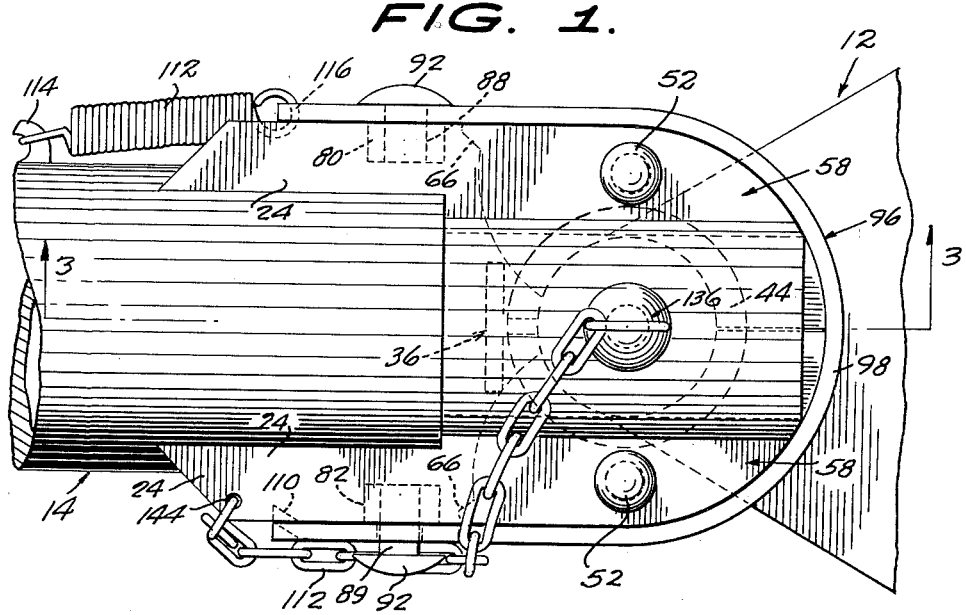
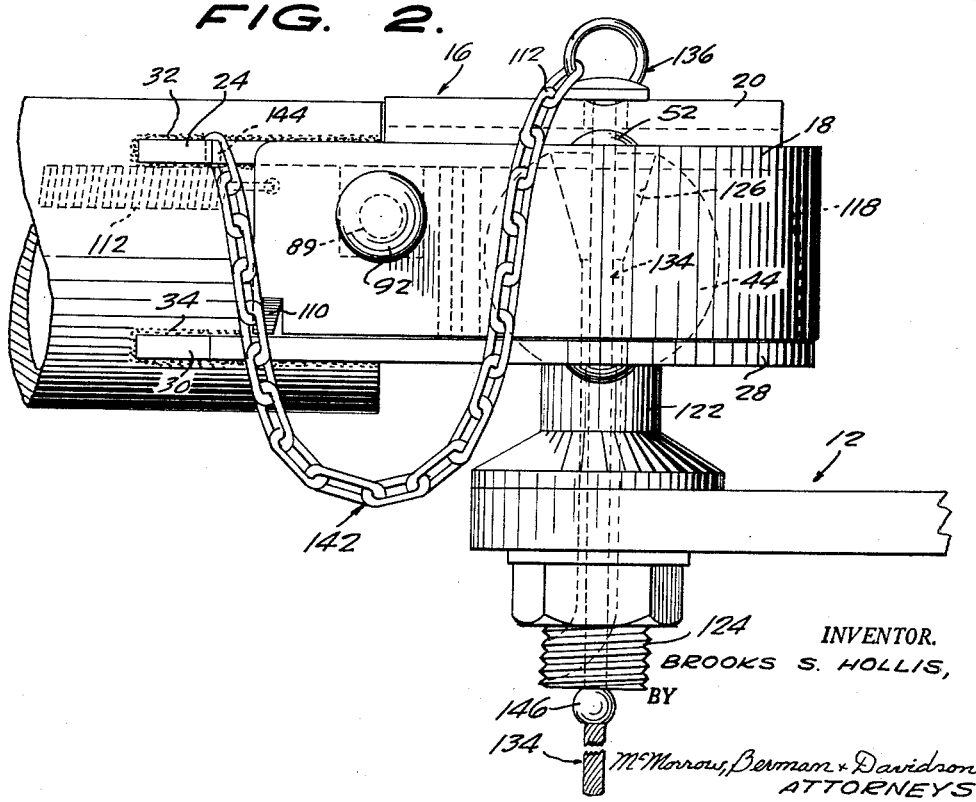

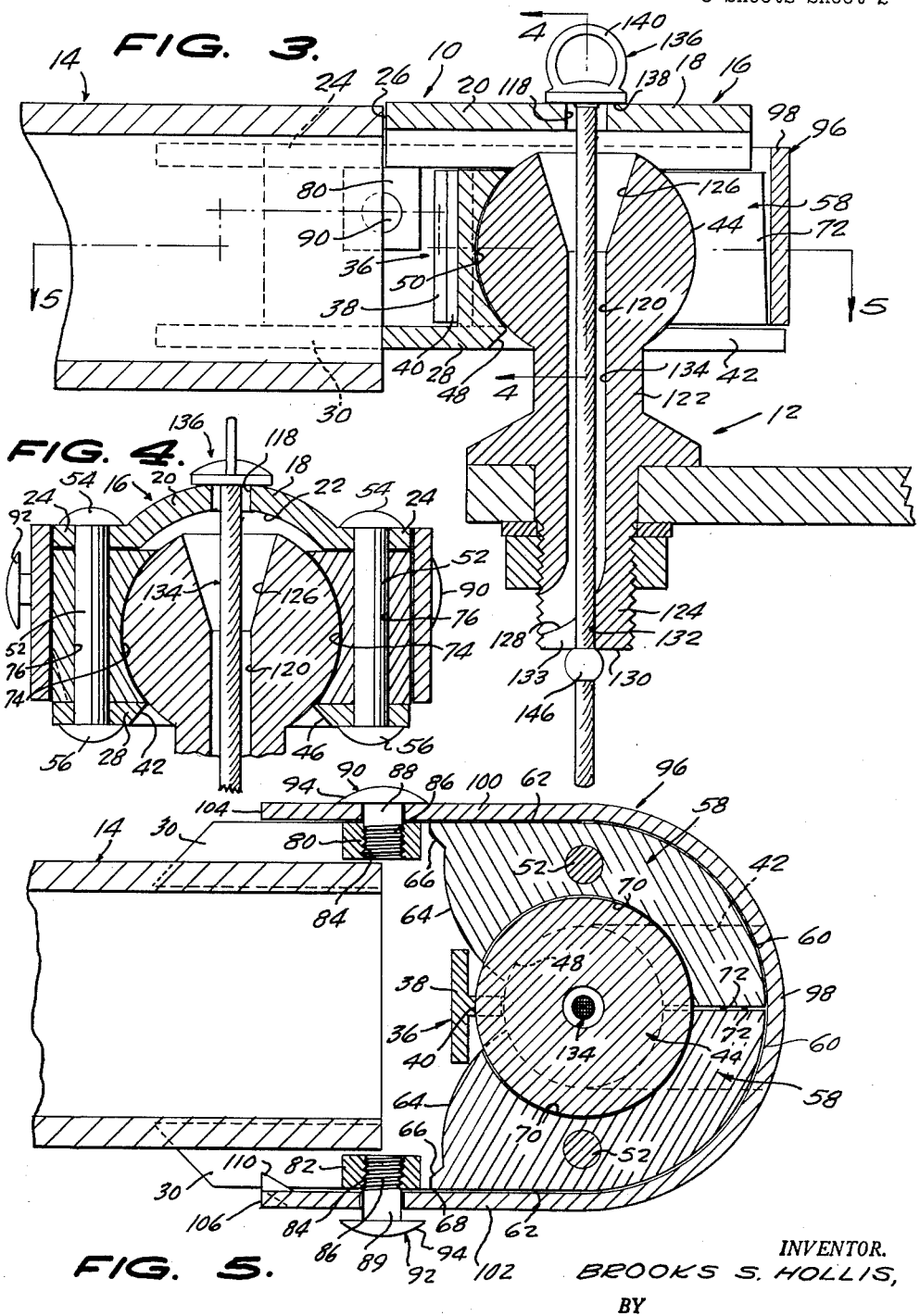

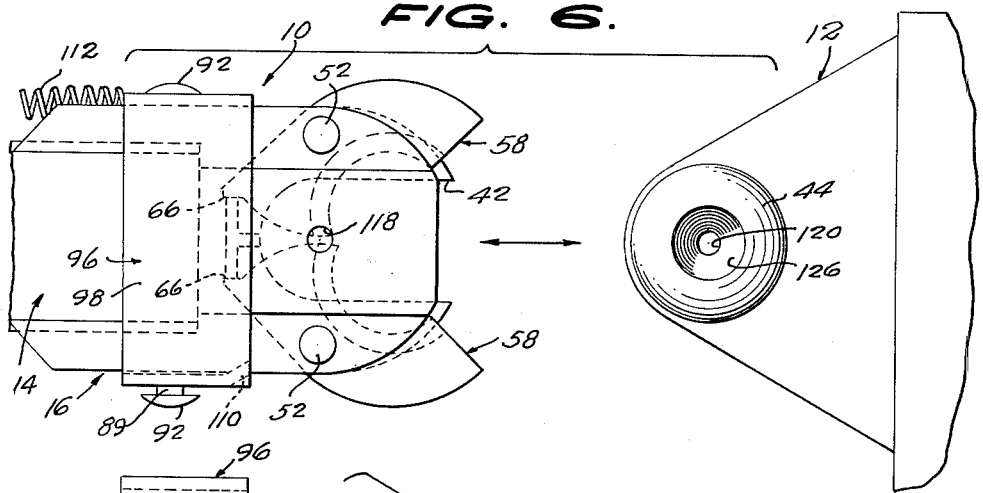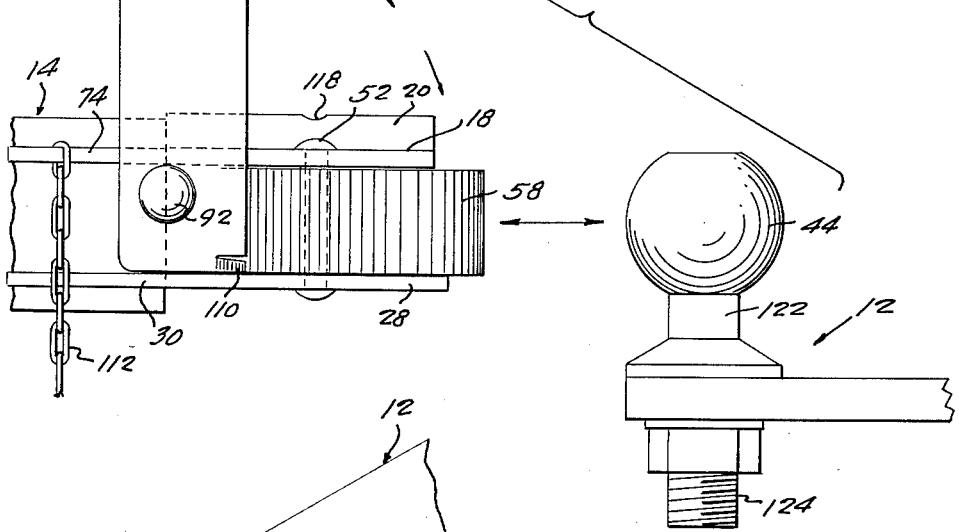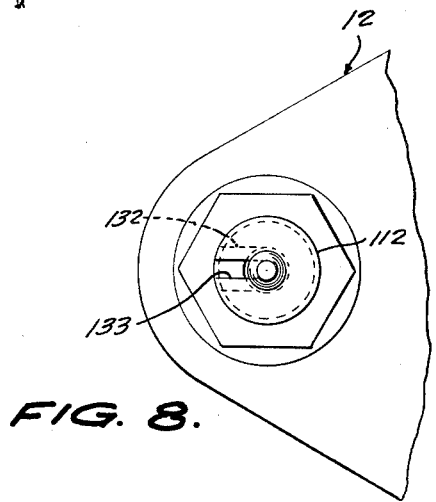

3,046,038
TRAILER COUPLING
Brooks S. Hollis, 1501 Roosevelt Drive, Ruston, La.
Filed Nov. 18, 1960, Ser. No. 70,182
3 Claims. (Cl. 280—512)

This invention relates to an improved trailer coupling of the ball and socket type.

The primary object of the invention is the provision of a generally superior, simpler and less expensive coupling of the kind indicated, which is safer and more reliable in use, and which, in the case of breakage of the ball hitch involved, has means which positively prevents full disconnection of the coupling from the trailer hitch.

Another object of the invention is the provision of a coupling of the character indicated, which when closed, locks automatically, and which does not require any further manual adjustment for achieving a positive lock.

Another object of the invention is the provision of a coupling of the character indicated above which enables the user thereof to preset the coupling for a fully automatic and locked connection or hook-up with a ball hitch by backing the tractor or towing vehicle hitch to the coupling, without the necessity of lifting a heavy trailer, and without the use of any tools, and which can be quickly and easily so preset, and quickly and easily closed by hand.

A further object of the invention is the provision of a coupling of the character indicated above which requires no adjustments, once coupled to a ball hitch, for achieving a close and full ball-and-socket engagement with a ball hitch, wedging means being provided which automatically compensates for wear on a hitch ball and on the ball-gripping members of the coupling.

A still further object of the invention is the provision, in a coupling of the character indicated above, of pivoted hitch ball embracing socket-forming jaws which are readily replaceable when worn, and which are readily replaceable with jaws to accommodate hitch balls of different diameters, without involving disgarding the hitch itself or any other part or parts of the coupling.

Yet another object of the invention is the provision, in a coupling of the character indicated above, of a safety hitch ball tether which, while the coupling is connected to a hitch ball, positively prevents complete separation or disconnection of the trailer coupling from the hitch of the towing or tractor vehicle, through release of the hitch ball by the coupling jaws through failure of the latching means therefor, or through breaking off of the neck of the ball hitch.

Still another object of the invention is the provision of a safety hitch ball tether of the character indicated above which is substantially entirely concealed within the hitch ball, the hitch ball neck, and the hitch ball mounting stem, whereby the use of unsightly and exposed safety chains is eliminated.

Other important objects and advantageous features of the invention will be apparent from the following description and the accompanying drawings, wherein, for purposes of illustration only, a specific form of the invention is set forth in detail.

In the drawings:

FIGURE 1 is a top plan view showing a coupling of the present invention mounted on the tongue of a trailer and connected to the ball hitch of a towing vehicle.

FIGURE 2 is a side elevation of FIGURE 1.

FIGURE 3 is a vertical longitudinal section taken on the line 3—3 of FIGURE 1.

FIGURE 4 is a fragmentary vertical transverse section taken on the line 4—4 of FIGURE 3.

FIGURE 5 is a horizontal section taken on the line 5—5 of FIGURE 3.

FIGURE 6 is a schematic top plan view, on a reduced scale, showing the coupling set with its jaws in open position, preliminary to automatic closing of the jaws on a hitch ball by the rearward movement therebetween of a towing vehicle ball hitch.

FIGURE 7 is a side elevation of FIGURE 6.

FIGURE 8 is a fragmentary bottom plan view of the ball hitch.

Referring in detail to the drawings, wherein like numerals designate like parts throughout the several views, the illustrated coupling, generally designated 10, is adapted to be connected to a ball hitch 12, the coupling 10 being fixedly mounted on a trailer tongue 14.

The coupling 10 comprises an open-sided housing 16 having a horizontal longitudinal top plate 18 which has an upstanding arcuate main portion 20 having a concave undersurface 22 and longitudinal side flanges 24 which are extended horizontally and rearwardly behind the rear end 26 of the main portion 20, and a flat horizontal bottom plate 28.

The flat bottom plate 28 has longitudinal flanges 30 along its side edges which reach rearwardly beyond the rear end of the top plate 18, and underlie the corresponding portions of the side flanges 24 of the top plate. The two sets of flanges are, at their laterally inward edges, secured, as by means of weldings 32 and 34, respectively, to the exterior of the tubular cylindrical trailer tongue 14, whereby the housing 16 is, in effect, an axial longitudinal extension of the tongue 14. Unless otherwise desired, the tongue 14 is cut to a relatively short length, so that the remainder of the tongue 14 and the coupling 10 provide a normal distance between the trailer and the towing vehicle.

The top plate 18 and the bottom plate 28 are in parallel spaced relationship and are connected together and braced relative to each other by means of a vertical T-cross section strut 36, which is centered relative to the top and bottom plates, at a location near to and spaced from their rear ends, as shown in FIGURES 1 and 5. The strut 36 has its crosshead 38 extending crosswise of the housing 16 and its standard 40 extending forwardly, along the longitudinal centerline of the housing. The strut 36 serves also as a stop for the jaws of the coupling, as hereinafter set forth.

The bottom plate 28 is provided, in the forward end, with a central longitudinal notch 42, which, as shown in FIGURE 4, is wide enough to accept the lower part of the ball 44 of the towing vehicle hitch 12. The edges of the notch 42 are preferably upwardly beveled, as indicated at 46. The forward ends of the top and bottom plates 18, 28 are preferably arcuate and concentric with the arcuate closed end 48 of the notch 42, as shown in FIGURE 5, and the forward edge of the standard 40 of the stop strut 36 is arcuate, as indicated at 50, to conformably receive the rear side of the hitch ball 44, as shown in FIGURES 3 and 5.

In line with the center of the arcuate end 48 of the notch 42 is a pair of vertical jaw pivot pins 52, which extend through the side flanges 24 of the top plate 18 and those of the bottom plate 28, the pivot pins 52 preferably having riveted heads on their upper and lower ends, as indicated at 54 and 56, respectively. Similar but reversed socket forming hitch ball embracing jaws 58 are pivoted on the pivot pins 52.

The jaws 58 preferably comprise solid flat horizontal blocks having quarter circular forward ends 60 which merge into straight tangent outer sides 62. The jaws have arcuate rear ends 64 which run close to the ends of the crosshead 38 of the stop strut 36, at the forward side thereof. On the rear ends 64, at the outer ends thereof, are rearwardly projecting stop lugs 66 which have beveled inward surfaces 68 to bear against the ends of the crosshead 38, in the open position of the jaws, as shown in FIGURE 6.

The inner sides of the jaws 58 are composed of substantially two-third circular portions 70 and flat diametrical portions 72, which reach from the portions 70 to the forward ends of the jaws. The circular portions 70 are provided with cam or arcuate concave hitch ball embracing surfaces 74. The jaws 58 have vertical bores 76, located in line with the meetings of their forward ends 60 and their outer sides 62, which receive the pivot pins 52, and the top and bottom surfaces of the jaws 58 bear against the side flanges 24 of the top plate 18 and the upper surface of the bottom plate 28. As shown in FIGURE 5, the flat diametrical portions 72 of the inner sides of the jaws 58 are, with the jaws gripping a hitch ball 44, spaced slightly from each other, so that the jaws can be moved toward each other, in a manner hereinafter set forth, for increasing the conforming grip of the jaws on the hitch ball 44, and for taking up any wear which may develop in the jaw surfaces and pivot pins, and on the hitch ball 44.

Extending downwardly from the top plate side flanges 24 and immediately behind the jaws 58, are bracket blocks 80 and 82 which have threaded horizontal bores 84 which are aligned with each other crosswise of the housing 16. Into the bore 84 of the block 80 is threaded the threaded end 86 on the smooth shank 88 of a pivot bolt 90. A similar but longer pivot bolt 92 having a shank 89, is threaded into the bore 84 of the other bracket block 82. The bolts 90 and 92 have enlarged heads 94 on their outer ends, and constitute the mountings for a swingable jaw locking bail 96.

The locking bail 96 is U-shaped and of flat bar stock of limited resistance, and has an arcuate bight portion 98 which conforms in curvature to the forward ends of the jaws 58, and normally parallel straight legs 100 and 102 which have squared terminal rear ends 104, and 106, respectively, the legs being journaled on the smooth shank portions 88 and 89 of the bolts 90 and 92, respectively, the shank portion 89 being longer than the shank portion 88. At the lower corner of the rear end 106 of the bail leg 102 is formed an inwardly and rearwardly angled fixed latch finger 110, which bears upon the upper surface of the housing bottom plate 28, for holding the bail 96 in its erect retracted position, as shown in FIGURE 7. The bail pivot bolts 90 and 92 are journaled through the bail legs on centers which are laterally off-set above the centerlines of the legs, in order to obtain an overcenter forward acceleration of the bail 96, when moved toward jaw locking position, and a rearward over-center acceleration of the bail 96 toward erect retracted position. A contractile helical spring 112 is connected, at its rear end, on a hook 114 on the trailer tongue located behind the housing 16, and connected at its forward end in a hole 116 in the rear end of the bail leg 102, as shown in FIGURE 1, whereby the bail 96 is spring biased rearwardly downwardly toward jaw locking position.

The bight portion 98 of the bail 96 is shaped so that the leg 102 is biased inwardly, and requires to be manually flexed outwardly to enable the latch finger 110 to pass around the related side edge of the plate 28, as the bail is elevated to its erect position, so that the finger 110 bears upon the upper surface of the plate 28, when the leg 102 is released.

For producing a jaw-contracting wedging action, as the bail 96 moves downwardly the full jaw locking position, for the purpose already indicated hereinabove, the forward ends 60 of the jaws 58 can be slightly tapered, in an upward direction, as indicated at 118, in FIGURES 2 and 3, whereby descent of the bight portion 98 of the bail, in contact with the tapered ends, forces the jaws toward each other, as an incident to the arrival of the bail 96 in its jaw locking position.

In operation, the bail 96 having been retracted, by hand, to its erect retracted position, and the jaws 58 having been set apart, by hand, out through the open sides of the housing 16, as shown in FIGURE 6, with their stop lugs engaged with the stop strut 36, hitch ball 48 of the towing vehicle can be locked to and between the jaws 58. As this takes place, the hitch ball 44 pushes against the rear ends of the arcuate portions 70 of the jaws and pivots the jaws toward each other, so that the jaws close and start to embrace the hitch ball with their concavities 74. As the jaws 58 approach their closed positions, the lugs 66 on the rear end 64 of a related jaw 58 engages the latch 110 on the leg 102 of the bail 96 and pushes the leg 102 out laterally, far enough to dislodge the latch lug 110 from the upper surface of the housing bottom plate 28, whereat the spring 112 acts to swing the bail forwardly and downwardly out of its erect retracted position, whereat the legs of the bail 96 make cam engagements with the flat outer sides 62 of the jaws 58 and force the jaws further toward each other, into fully closed positions around the hitch ball 44. As the bail 96 moves into the depressed locked position, the inward tension of the bail leg 102 is released, so that the latch finger 110 is thereby engaged with the upper surface of the plate 28, and locks the bail. The bail 96 is stopped in its depressed locked position by engagement of its bight portion 98 with the bottom plate 28. The foregoing constitutes automatic locking of the coupling 10.

For releasing the coupling 10 from a towing vehicle hitch ball 44, outward manual pressure is exerted on the bail leg 102, so that the latch finger 110 is clear of the related edge of the plate 28, and the bail 96 is then elevated by hand to its erect retracted position, whereat the ball 44 can be released from between the jaws 58, either by spreading the jaws by hand or by moving the towing vehicle forwardly relative to the trailer.

For manually connecting the coupling 10 to a hitch ball 44, with the bail 96 in its erect retracted position, the jaws 58 in spread position are placed around the hitch ball. Then while restraining the bail 96, the leg 102 is pushed or pulled outwardly so as to release the latch lug 110 from the housing bottom plate 28 and let go. This frees the spring 112 to swing the bail downwardly and rearwardly, and to force its legs into camming contact with the then outwardly angled flat outer sides 62 of the jaws 58, whereby the jaws are forced toward each other around the hitch ball 44, in the same manner as in the automatic closing of the coupling explained hereinabove.

As shown in FIGURES 3 and 4, the main portion 20 of the housing top plate 18 is provided with a centered hole 118 which is axially aligned with the center of the hitch ball 44, when gripped between the jaws 58. The hole 118 is axially aligned with an axial vertical bore 120 which is formed through the ball 44, its neck 122, and its mounting stem 124. At its upper end, the bore 120 has a flared seat 126. The bore 120 has a curved lower end portion 128 which opens through the rearward side of the hitch stem 124, near the lower end 130 thereof. A second bore 132, smaller in diameter than the bore 120, extends downwardly from the curved bore portion 128 to the lower end 130. A slot 133 enters the second bore 132 from the rearward side of the hitch stem 124.

A flexible safety tether cable 134 is provided whose effective length is only slightly longer than the distance between the upper surface of the main portion 20 of the housing top plate 18, and the lower end 130 of the ball hitch stem 124. On the upper end of the cable 134 an enlarged head 136 is fixed, which has a flat undersurface 138, to bear upon the upper surface of said main portion 20, with an upstanding loop 140, to serve as a handle and for connection to the head 136 of one end of a keeper chain 142 which extends rearwardly and is connected at its other end, as indicated at 144, to a side flange 24 of the housing top plate 18. A detent ball 146 is fixed on the lower part of the cable 134, which, with the head 136 defines the effective length of the cable, the ball being smaller in diameter than the bore 120 and larger in diameter than the second bore 132 and the slot 133.

The tether cable 134 is used by passing its lower end and the detent ball 146 downwardly through the top plate hole 118, the hitch bore 120 and out through the curved bore portion 128. The lower end of the cable 134 is then passed forwardly through the slot 133 and the detent ball 146 releasably engaged under the lower end 130 of the stem 124, whereby upward movement of the housing 16, relative to the towing vehicle hitch, which could loosen the grip of the coupling jaws 58 on the hitch ball 44, is precluded. Further, should the neck of the ball 44 break off, or should the jaws 58 be released by malfunction of the mechanism of the coupling 10, the cable 134 prevents complete disconnection of the coupling 10 from the towing vehicle hitch, and keeps the trailer connected to the towing vehicle.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A coupling for a trailer having a forwardly extending tongue, comprising a housing fixed on and extending forwardly from the tongue, a pair of opposed jaws pivoted on vertical axes on the housing, said jaws having inner sides formed with hitch ball embracing concavities, said jaws having forward ends and outer sides, said outer sides having cam surfaces, a U-shaped jaw locking bail having a bight portion and legs, said legs being horizontally pivoted on the housing at opposite sides of the housing, said bail being swingable forwardly and downwardly from an elevated retracted position to a horizontal jaw locking position wherein said legs engage the outer sides of the jaw and said bight portion engages the forward ends of the jaws, in the closed positions of the jaws, the bail legs and the jaw cam surfaces being positioned relative to each other to cause the bail legs to make cam engagement with the cam surfaces, with the jaws in open spread positions, whereby the jaws are closed from open positions as the bail is moved toward jaw locking position, latch means for releasably holding the bail in elevated retracted position, spring means biasing the bail toward its jaw-locking position, said latch means comprising a latch lug on the rear end of one leg of the bail, said one leg being flexible away from the housing, and a stop lug on the rear end of one jaw, said latch lug being engaged with a part of the housing in the retracted position of the bail, said stop lug being engageable with the latch lug as said one jaw is moved toward closed position and push the one leg out laterally whereby the said one leg is flexed to dislodge the latch lug from the housing and enable said spring means to operate the bail to jaw locking position.

2. A coupling for a trailer having a forwardly extending tongue, comprising a housing fixed on and extending forwardly from the tongue, a pair of opposed jaws pivoted on vertical axes on the housing, said jaws having inner sides formed with hitch ball embracing concavities, said jaws having forward ends and outer sides, said outer sides having cam surfaces, a U-shaped jaw locking bail having a bight portion and legs, said legs being horizontally pivoted on the housing at opposite sides of the housing, said bail being swingable forwardly and downwardly from an elevated retracted position to a horizontal jaw locking position wherein said legs engage the outer sides of the jaw and said bight portion engages the forward ends of the jaws, in the closed positions of the jaws, the bail legs and the jaw cam surfaces being positioned relative to each other to cause the bail legs to make cam engagement with the cam surfaces, with the jaws in open spread positions, whereby the jaws are closed from open positions as the bail is moved toward jaw locking position, latch means for releasably holding the bail in elevated retracted position, spring means biasing the bail toward its jaw-locking position, said latch means comprising a latch lug on the rear end of one leg of the bail, said one leg being flexible away from the housing, and a stop lug on the rear end of one jaw, said latch lug being engaged with a part of the housing in the retracted position of the bail, said stop lug being engageable with the latch lug as said one jaw is moved toward closed position and push the one leg out laterally whereby the said one leg is fixed to dislodge the latch lug from the housing and enable said spring means to operate the bail to jaw-locking position, said housing being open-sided and having spaced top and bottom plates between which the jaws are positioned, pivot pins engaged in and extending between the top and bottom plates on which the jaws are pivoted, the bail legs being pivoted on the top plate.

3. A coupling for a trailer having a forwardly extending tongue, comprising a housing fixed on and extending forwardly from the tongue, a pair of opposed jaws pivoted on vertical axes on the housing, said jaws having inner sides formed with hitch ball embracing concavities, said jaws having forward ends and outer sides, said outer sides having cam surfaces, a U-shaped jaw locking bail having a bight portion and legs, said legs being horizontally pivoted on the housing at opposite sides of the housing, said bail being swingable forwardly and downwardly from an elevated retracted position to a horizontal jaw-locking position wherein said legs engage the outer sides of the jaw and said bight portion engages the forward ends of the jaws, in the closed positions of the jaws, the bail legs and the jaw cam surfaces being positioned relative to each other to cause the bail legs to make cam engagement with the cam surfaces, with the jaws in open spread positions, whereby the jaws are closed from open positions as the bail is moved toward jaw-locking position, latch means for releasably holding the bail in elevated retracted position, spring means biasing the bail toward its jaw-locking position, said latch means comprising a latch lug on the rear end of one leg of the bail, said one leg being flexible away from the housing, and a stop lug on the rear end of one jaw, said latch lug being engaged with a part of the housing in the retracted position of the bail, said stop lug being engageable with the latch lug as said one jaw is moved toward closed position and push the one leg out laterally whereby the said one leg is flexed to dislodge the latch lug from the housing and enable said spring means to operate the bail to jaw-locking position, said housing being open-sided and having spaced top and bottom plates between which the jaws are positioned, pivot pins engaged in and extending between the top and bottom plates on which the jaws are pivoted, the bail legs being pivoted on the top plate, a vertical stop strut extending between and fixed to the top and bottom plates at a location centered with respect to and behind the jaws, the other jaw having a stop lug on its rear, the stop lugs having stop engagement with the stop strut in the open positions of the jaws.

References Cited in the file of this patent

UNITED STATES PATENTS

| | | |
|---|---|---|
| 2,251,656 | Botelho | Aug. 5, 1941 |
| 2,475,878 | Clark et al. | July 12, 1949 |
| 2,726,099 | Nunn | Dec. 6, 1955 |
| 2,937,885 | Skow | May 24, 1960 |